(12) United States Patent
Bowers

(10) Patent No.: US 6,270,112 B1
(45) Date of Patent: Aug. 7, 2001

(54) MECHANISM FOR SECURING PASSENGER SIDE AIR BAG DOOR

(75) Inventor: Paul A. Bowers, Ray, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/512,587

(22) Filed: Feb. 24, 2000

(51) Int. Cl.[7] .......................... B60R 21/20; B60R 21/045
(52) U.S. Cl. .......................... 280/728.3; 280/732; 280/753
(58) Field of Search .................. 280/728.3, 732, 280/728.2, 729, 730.1, 753, 751, 752

(56) References Cited

U.S. PATENT DOCUMENTS

| | | |
|---|---|---|
| 3,951,427 | 4/1976 | Wilfert . |
| 4,417,750 * | 11/1983 | Burry ..................... 280/753 |
| 4,948,168 | 8/1990 | Adomeit et al. . |
| 5,411,288 | 5/1995 | Steffens, Jr. . |
| 5,431,422 * | 7/1995 | Tomita et al. ............. 280/752 |
| 5,876,061 * | 3/1999 | Stavermann ............... 280/732 |
| 5,931,493 | 8/1999 | Sutherland . |
| 5,971,431 * | 10/1999 | Wohllebe et al. .......... 280/732 |
| 6,010,147 * | 1/2000 | Brown ..................... 280/728.2 |

FOREIGN PATENT DOCUMENTS 4243791    6/1994   (DE) .

* cited by examiner

Primary Examiner—J. J. Swann
Assistant Examiner—David R. Dunn
(74) Attorney, Agent, or Firm—Tarolli, Sundheim, Covell, Tummino & Szabo L.L.P.

(57) ABSTRACT

An apparatus (10) comprises an inflatable vehicle occupant protection device (56) having a deflated condition stored in an instrument panel (24) of a vehicle. The device (56) has an inflated condition extending out of the instrument panel (24) for helping to protect an occupant of the vehicle. A door (62) connected with the vehicle instrument panel (24) is movable between a closed condition covering the inflatable device (56) when in the deflated condition and an open condition. A knee bolster (20) is supported on the vehicle instrument panel (24) for movement in the vehicle from a stored position adjacent to the instrument panel of the vehicle to a blocking position spaced apart from the instrument panel. The knee bolster (20) when in the stored position helps to maintain the door (62) in the closed condition.

13 Claims, 2 Drawing Sheets

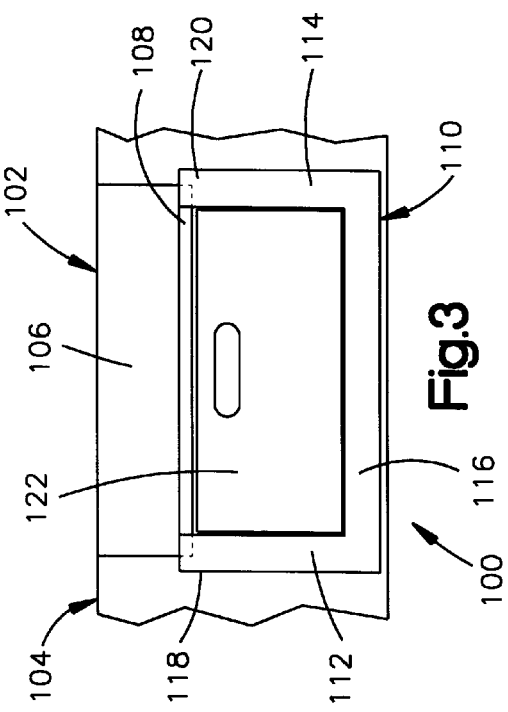
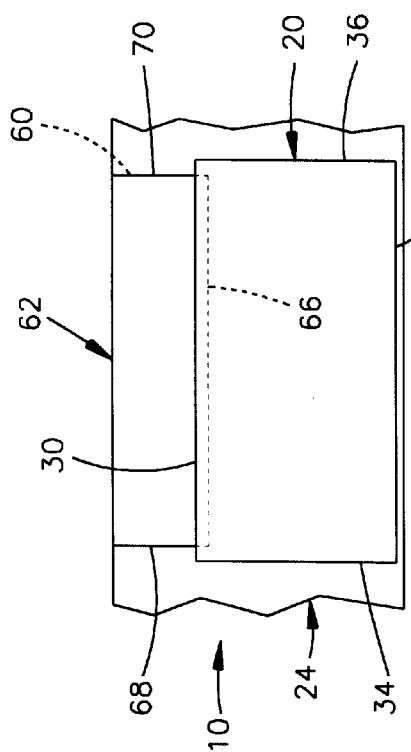
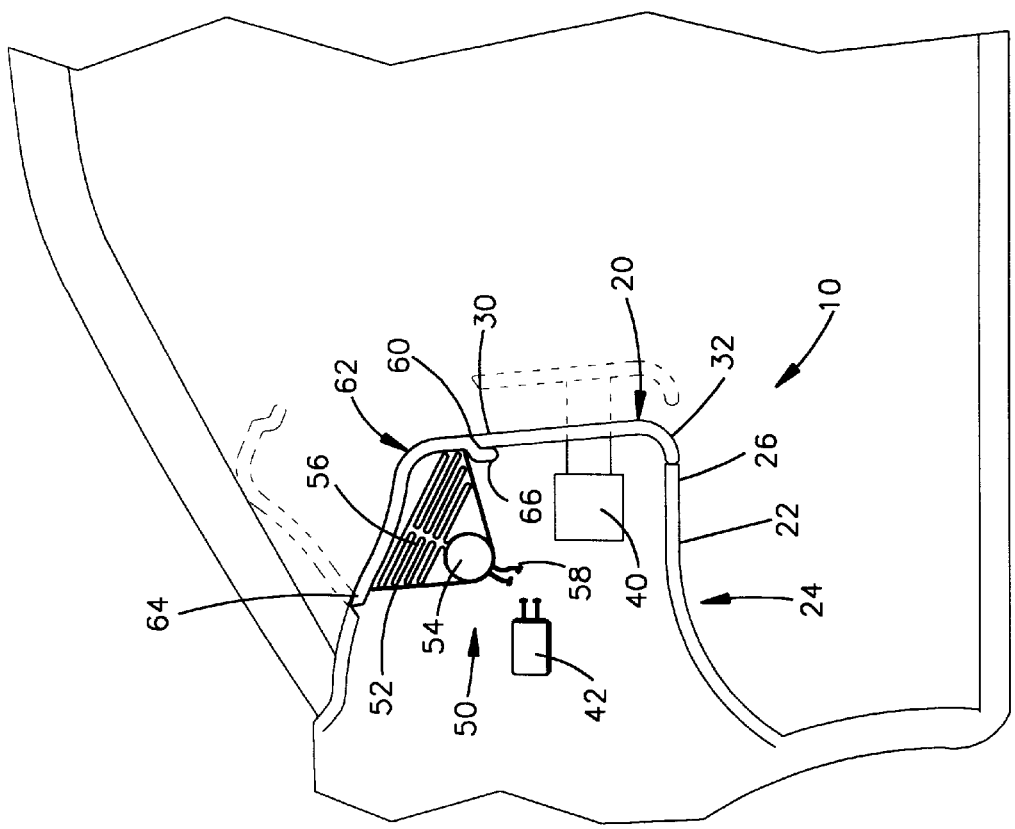

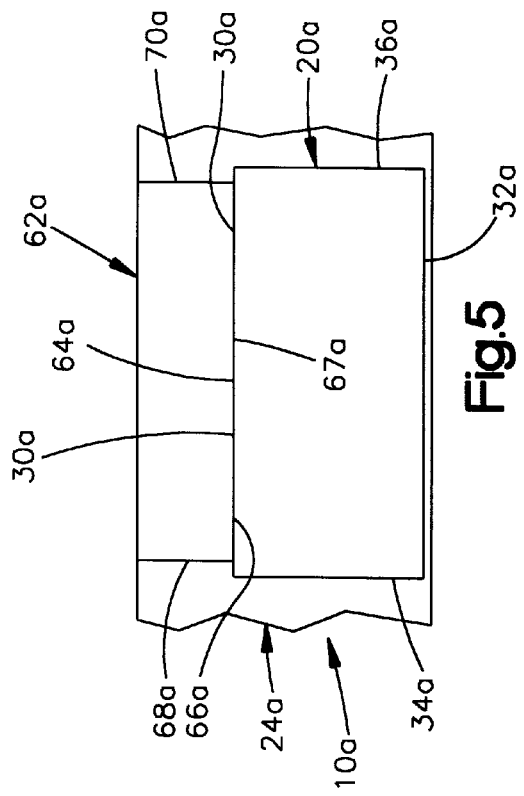
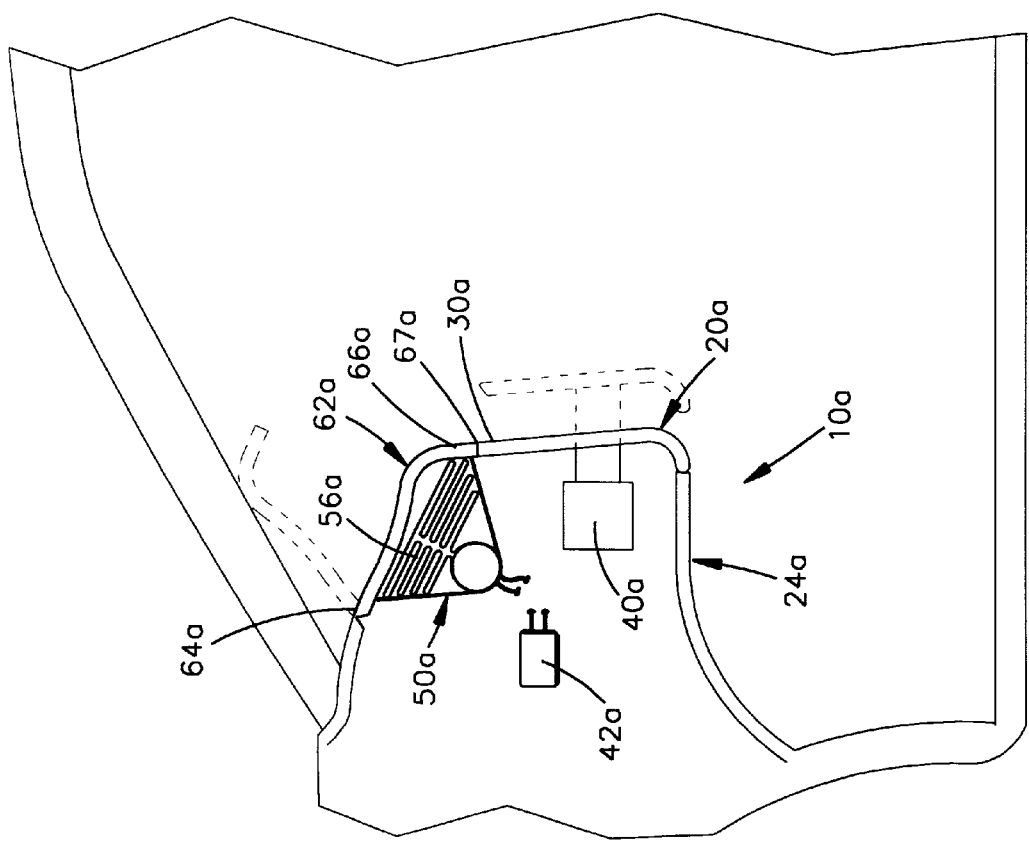

MECHANISM FOR SECURING PASSENGER SIDE AIR BAG DOOR

BACKGROUND OF THE INVENTION

1. Technical Field

The present invention relates to an apparatus for helping to protect an occupant of a vehicle. In particular, the invention relates to an apparatus including a mechanism for securing, or maintaining in a closed condition, a door for a passenger side air bag.

2. Description of the Prior Art

A known apparatus for helping to protect a front seat passenger of a vehicle includes an inflatable air bag stored in the vehicle instrument panel. The air bag inflates into the vehicle passenger compartment through a deployment opening in the instrument panel. A movable door covers the deployment opening. The door is normally held closed by a tear seam or a latch.

The force that is needed to open the door comes from the air bag. The air bag is initially pressurized beyond the amount needed simply to inflate the bag through the deployment opening. The force of the inflating air bag pushes open the door to enable movement of the air bag through the deployment opening into an inflated condition.

A front seat passenger intended to be protected by the air bag may be out of position, that is, may be positioned too close to the instrument panel. To minimize the amount of force applied to an out of position passenger, it would be desirable to limit the amount of force needed to open the door and, thereby, limit the initial force with which the air bag inflates.

Another known apparatus for helping to protect a front seat passenger of a vehicle is an actuatable knee bolster. A knee bolster is located at a lower portion of a vehicle instrument panel and is movable from a stored position adjacent to the instrument panel to a blocking position spaced apart from the instrument panel, in response to detection of a vehicle crash condition. The knee bolster can help to prevent the vehicle occupant from "submarining" underneath an inflated air bag.

SUMMARY OF THE INVENTION

The present invention is an apparatus comprising an inflatable vehicle occupant protection device having a deflated condition stored in an instrument panel of a vehicle. The inflatable device has an inflated condition extending out of the instrument panel for helping to protect an occupant of the vehicle. A door connected with the vehicle instrument panel is movable between a closed condition covering the inflatable device when in the deflated condition and an open condition. A knee bolster is supported on the vehicle instrument panel for movement in the vehicle from a stored position adjacent to the instrument panel of the vehicle to a blocking position spaced apart from the vehicle instrument panel. The knee bolster when in the stored position helps to maintain the door in the closed condition.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view, partially in section, of an apparatus in accordance with the present invention, including a knee bolster shown in a stored position and a deployment door shown in a closed condition;

FIG. 2 is a rear elevational view of the knee bolster and deployment door of FIG. 1;

FIG. 3 is a rear elevational view of a knee bolster and deployment door in accordance with a second embodiment of the invention;

FIG. 4 is a view similar to FIG. 1 of an apparatus in accordance with a third embodiment of the present invention; and FIG. 5 is a rear elevational view of the knee bolster and deployment door of FIG. 5.

DETAILED DESCRIPTION OF EMBODIMENTS OF THE INVENTION

The present invention relates to an apparatus for helping to protect an occupant of a vehicle. In particular, the invention relates to a mechanism for securing, or maintaining in a closed condition, a door for a passenger side air bag. As representative of the present invention, FIG. 1 illustrates an apparatus 10.

The apparatus 10 includes a knee bolster 20. The knee bolster 20 is mounted in a lower portion 22 of a vehicle instrument panel indicated schematically at 24. The lower portion 22 of the instrument panel 24 is the portion of the instrument panel that a vehicle occupant's knees would contact were the occupant to slide forward from a seated position to contact the instrument panel.

The instrument panel 24, which is of a known construction, includes a metal or plastic substrate (not shown) which supports a trim pad or cover 26. The knee bolster 20 is configured as a continuation of the cover 26. The knee bolster 20 is preferably covered with or made from a resilient material for cushioning contact between the knee bolster and an occupant of the vehicle. The knee bolster 20 has a generally rectangular configuration as viewed from the rear of the vehicle (FIG. 2), including upper and lower edge portions 30 and 32 and inboard and outboard side portions 34 and 36.

An actuator indicated schematically at 40 is located in the instrument panel 24. The actuator 40 is a known mechanism for moving the knee bolster 20 rearward from a stored position shown in solid lines in FIG. 1 to a blocking position (shown in dashed lines in FIG. 1) spaced apart from the instrument panel 24. The actuator 40 preferably includes an inflatable device (not shown) in the form of an air bag, and an inflator (not shown) for inflating the inflatable device. Other types of actuators can, alternatively, be used.

The actuator 40 is electrically connected to an actuation circuit 42. The actuation circuit 42 includes a crash sensor, such as an inertia switch or an accelerometer, and a controller. Upon detection of a crash condition requiring occupant protection, as sensed by the crash sensor, the controller controls the actuation circuit 42 so that the actuation circuit sends an electric signal to the actuator 40.

The apparatus 10 includes a passenger side air bag module 50. The module 50 includes a container 52 mounted in the instrument panel 24 at a location above the knee bolster 20 and the actuator 40. An inflator 54 is located inside the container 52 together with a folded air bag 56. The inflator 54 is electrically connected to the actuation circuit 42 by lead wires 58 for actuating the inflator when needed to help protect a front seat passenger of the vehicle.

The instrument panel 24 has a deployment opening 60 through which the air bag 56 is inflatable to help protect a passenger of the vehicle seated behind the module 50. The deployment opening 60 is closed by a cover or deployment door 62. The deployment door 62 has an upper edge portion 64, a lower edge portion 66, and inboard and outboard side portions 68 and 70. The upper edge portion 64 of the deployment door 62 is hingedly connected with the instrument panel 24 and supports the door for pivotal movement between a closed condition shown in solid lines in FIG. 1 and an open condition shown in dashed lines in FIG. 1. The inboard and outboard side portions 68 and 70 of the deployment door 62 are releasably connected with the instrument panel 24 by a suitable mechanism (not shown), such as tear seams or latches.

The lower edge portion 66 of the deployment door 62 is not directly connected with the instrument panel 24 by a tear seam or latch or such. Instead, the lower edge portion 66 of the deployment door 62 is at least partially covered by the knee bolster 20. Specifically, the upper edge portion 30 of the bolster 20 engages, or overlaps, the lower edge portion 66 of the deployment door 62. The upper edge portion 30 of the knee bolster 20 thereby prevents the lower edge portion 66 of the deployment door 62 from moving outward, that is, away from the instrument panel 24. As a result, the knee bolster 20, when in the stored position, secures or maintains the deployment door 62 in the closed condition.

Upon detection of a crash condition requiring occupant protection, as sensed by the crash sensor in the actuation circuit 42, the actuator 40 moves the knee bolster 20 from the stored position shown in solid lines in FIG. 1 to the blocking or open position shown in dashed lines in FIG. 1. The knee bolster 20, when in the blocking position shown dashed lines in FIG. 1, is positioned to contact the knees of a vehicle occupant and block further movement of the vehicle occupant in a forward direction in the vehicle. This blocking action can help to protect the vehicle occupant by preventing contact between the vehicle occupant and the instrument panel 24, and by preventing the vehicle occupant from "submarining" underneath the inflated air bag 56.

After the knee bolster 20 is thus moved, the inflator 54 for the air bag 56 is actuated. The inflator 54 produces inflation fluid under pressure which is directed into the air bag 56. The increased pressure in the air bag 56 causes the air bag to inflate outward against the deployment door 62. When the force of the inflating air bag 56 overcomes the resistance of the tear seams or latches or other mechanism that releasably secure the door 62, the door opens. The air bag 56 can then inflate into the vehicle passenger compartment.

Because the knee bolster 20 previously moved to a position spaced apart from the deployment door 62, the lower edge portion 66 of the deployment door is not restrained from movement when the air bag 56 inflates. As a result, less force is required to open the door 62 than would be required were the lower edge portion 66 of the door secured to the instrument panel 24 like the other edge portions of the door. Because less force is required to open the door 62, the pressure in the air bag 56 can be lower at the time the door opens and the air bag inflates into the passenger compartment. This can help reduce the amount of force applied to an out of position passenger of the vehicle.

FIG. 3 illustrates schematically a portion of an apparatus 100 in accordance with a second embodiment of the invention. The apparatus 100 includes a passenger side air bag module 102 mounted in a vehicle instrument panel 104. The air bag module 102 includes a deployment door 106 that is similar in construction and operation to the deployment door 62 (FIGS. 1–2). The deployment door 106 has a lower edge portion 108 that is not connected with the instrument panel 104 by a tear seam or otherwise.

The apparatus 100 includes a knee bolster 110. The knee bolster 110 has a U-shaped configuration including inboard and outboard side portions 112 and 114 connected by a base portion 116. The side portions 112 and 114 have upper edge portions 118 and 120, respectively. A glove box 122 is located within the U-shaped configuration of the bolster 110.

The upper edge portions 118 and 120 of the knee bolster 110 engage, or overlap, the lower edge portion 108 of the deployment door 106. This overlapping engagement prevents the lower edge portion 108 of the deployment door 106 from moving outward, that is, away from the instrument panel 104. As a result, the knee bolster 110 maintains the deployment door 106 in a closed condition when the knee bolster is in the stored position.

When the knee bolster 110 is moved from the stored position to a position spaced apart from the instrument panel 104, the upper edge portions 118 and 120 of the knee bolster move away from the lower edge portion 108 of the deployment door 106. The lower edge portion 108 of the deployment door 106 is released and does not offer any resistance to opening by the inflating air bag of the module 102. As a result, less force is required to open the door 106 than would be required were the lower edge portion 108 of the door secured to the instrument panel 104.

FIGS. 4 and 5 illustrate an apparatus 10a in accordance with a third embodiment of the invention. The apparatus 10a is similar to the apparatus 10 (FIGS. 1–2) and parts that are the same are given the same reference numerals with the suffix "a" added for clarity.

The apparatus 10a includes a deployment door 62a and a knee bolster 20a. The deployment door 62a has an upper edge portion 64a that is hingedly connected with the instrument panel 24a. The deployment door 62a also has a lower edge portion 66a and inboard and outboard side portions 68a and 70a.

The knee bolster 20a has an upper edge portion 30a, a lower edge portion 32a and inboard and outboard side portions 34a and 36a. The deployment door 62a is molded as one piece with the resilient material of the knee bolster 20a. The upper edge portion 30a of the knee bolster 20a is connected with the lower edge portion 66a of the deployment door 62a by a common tear seam 67. As a result, the knee bolster 20a is in engagement with the door 62a along the tear seam 67.

When the knee bolster 20a is actuated, it moves away from the instrument panel 24a, rupturing the tear seam 67 between the upper edge portion 30a of the knee bolster and the lower edge portion 66a of the deployment door 62a. As a result, the lower edge portion 66a of the deployment door 62a is not restrained from movement and thus does not offer any resistance to opening. Less force is therefore required to open the deployment door 62a than would be required were the lower edge portion 66a of the door secured to the instrument panel 24a like the other edge portions of the door.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus comprising:
   an inflatable vehicle occupant protection device having a deflated condition stored in an instrument panel of a vehicle and having an inflated condition extending out of the instrument panel for helping to protect an occupant of the vehicle;

an energizable first actuator for providing inflation fluid for inflating said protection device;

a door connected with the vehicle instrument panel, said door being movable between a closed condition covering said inflatable device when in the deflated condition and an open condition due to inflation of said protection device by said first actuator;

a knee bolster supported on the vehicle instrument panel for movement in the vehicle from a stored position adjacent to the instrument panel of the vehicle to a blocking position spaced apart from the vehicle instrument panel; and an enercizable second actuator for moving said knee bolster from the stored condition to the blocking condition, said second actuator being energizable independently of said first actuator;

said knee bolster when in the stored position helping to maintain said door in the closed condition.

2. An apparatus as set forth in claim 1 wherein a first edge portion of said door is hingedly connected with the vehicle instrument panel and wherein said knee bolster has a portion that overlaps a second edge portion of said door opposite said first edge portion when said knee bolster is in the stored condition, said knee bolster portion moving away from said second edge portion of said door upon movement of said knee bolster to the blocking condition upon energizing of said second actuator.

3. An apparatus as set forth in claim 2 wherein said knee bolster overlaps only a portion of said second edge portion of said door.

4. An apparatus as set forth in claim 1 wherein said knee bolster overlaps an edge portion of said door to maintain said door in the closed condition when said knee bolster is in the stored condition, said knee bolster portion moving away from said second edge portion of said door upon movement of said knee bolster to the blocking condition upon energizing of said second actuator.

5. An apparatus as set forth in claim 1 wherein said door has an edge portion that has a tear seam in common with said knee bolster that maintains said door in the closed condition when said knee bolster is in the stored position, said knee bolster when moved to the blocking position upon energizing of said second actuator causing said tear seam to rupture to enable opening of said door upon inflation of said protection device by said first actuator.

6. An apparatus as set forth in claim 1 wherein said door is movable from the closed condition to the open condition upon the application of a first amount of force when said knee bolster is in the stored condition, said door being movable from the closed condition to the open condition upon the application of a second amount of force less than said first amount of force when said knee bolster is spaced apart from the stored position after energizing of said second actuator.

7. An apparatus as set forth in claim 6 wherein said knee bolster is in engagement with said door when said knee bolster is in the stored position and is spaced apart from said door when said knee bolster is in the blocking position.

8. An apparatus as set forth in claim 1 wherein said second actuator includes a second inflatable device and an inflator for inflating said second inflatable device.

9. An apparatus comprising:

an inflatable vehicle occupant protection device having a deflated condition in a vehicle and having an inflated condition for helping to protect an occupant of the vehicle;

a first actuator for causing inflation of said protection device;

a door connected with the vehicle, said door being movable by said inflatable device when inflated between a closed condition covering said inflatable device when in the deflated condition and an open condition; and a member supported on the vehicle for movement between a stored position and an actuated position for helping to protect a vehicle occupant, said member when in the stored position blocking movement of said door;

a second actuator energizable independently of said first actuator for causing movement of said member out of the stored position;

said door being movable from the closed condition to the open condition upon the application of a first amount of force when said member is in the stored position;

said door being movable from the closed condition to the open condition upon the application of a second amount of force less than said first amount of force when said member is spaced from said stored position.

10. An apparatus as set forth in claims 9 wherein said member is a knee bolster.

11. An apparatus as set forth in claim 9 wherein said member is in engagement with said door when said member is in the stored position and is spaced apart from said door when said member is in the actuated position.

12. An apparatus as set forth in claim 11 wherein said member overlaps an edge portion of said door to maintain said door in the closed condition.

13. An apparatus as set forth in claim 11 wherein said door has an edge portion that has a tear seam in common with said member that maintains said door in the closed condition when said member is in the stored position, said member when moved to the actuated position causing said tear seam to rupture to enable opening of said door.

* * * * *